Figure 1:
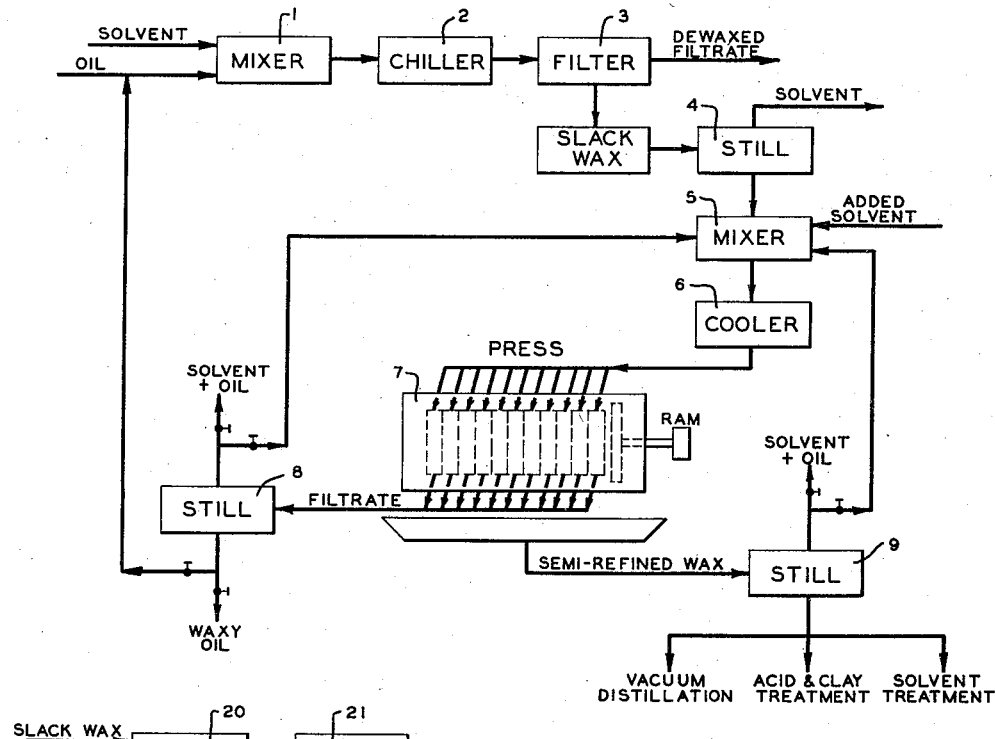

July 4, 1939.  R. E. MANLEY  2,164,779
RECOVERY OF WAX
Filed March 15, 1938

INVENTOR
ROBERT E. MANLEY
BY
ATTORNEY

Patented July 4, 1939

2,164,779

UNITED STATES PATENT OFFICE 2,164,779

RECOVERY OF WAX

Robert E. Manley, Yonkers, N. Y., assignor to The Texas Company, New York, N. Y., a corporation of Delaware Application March 15, 1938, Serial No. 195,943

1 Claim. (Cl. 196—18)

This invention relates to the recovery of wax from mixtures of wax and hydrocarbon oil.

The invention contemplates removing oil from waxy concentrates, such as slack wax, by filtration, advantageously in the presence of a solvent for oil, under superatmospheric pressure sufficiently elevated that the oil is forced from the wax, thereby producing a substantially oil-free wax. It contemplates the treatment of slack wax, such as is obtained in the dewaxing of hydrocarbon oil, such as wax-bearing lubricating oil stocks. The treatment of the slack wax may be carried out in conjunction with the conventional dewaxing operations.

The invention further contemplates subjecting slack wax, or waxy concentrates, to filtration under superatmospheric pressure in stages and at different temperatures so as to produce deoiled wax fractions having different melting point characteristics.

More specifically, the invention comprises charging a waxy concentrate, such as slack wax, mixed with a small amount of solvent, to a hydraulic type of filter press as, for example, a Carver type of pot press, modifications of which are described in United States Patents Nos. 1,679,464, 1,771,526, and 1,826,729. The slack wax is subjected to filtration in the press under a relatively low pressure of around 40 to 300 pounds per square inch gauge until a filler cake of substantial thickness is formed. Thereafter, the introduction of charge is discontinued and the resulting filter cake or filter cakes are subjected to compression within the filter under a pressure of around 1000 pounds, or in the range of about 800 to 1500 pounds per square inch gauge pressure to remove a further quantity of oil from the wax.

Filtrate is produced during the entire filtering operation, including the compression step, and this filtrate comprises oil and some wax. The amount of wax contained in the filtrate depends upon the temperature of filtration, as well as upon the amount of solvent or diluent present in the slack wax charge.

The compressed cakes are dumped from the filter and comprise de-oiled wax. As later described this de-oiled wax may be subjected to further treatment such as acid treatment, vacuum distillation, etc.

Filtration under extremely high pressure has been employed in other fields as, for example, in the expressing of fluids from materials such as ground cocoa beans. However, the employment of this type of filtration and the manner of its employment in the manufacture of wax derived from petroleum is novel. One of the novel features, for example, in regard to the manner of employment, involves the use of a solvent, which is not necessary when pressing ground cocoa beans and the like.

The solid material contained in cocoa beans, for example, is capable of withstanding extremely high pressure, such as 6,000 pounds per square inch without there being any extrusion of the solids during the pressing operation.

The structure of petroleum wax, however, is of such nature that it cannot be subjected to extremely high filter pressures without extrusion of the wax through the filtering surface in substantial amount. On the other hand, if the pressure is insufficiently high the oil will not be satisfactorily removed from the wax.

It has been found, however, that if the waxy concentrate is mixed with a small amount of a suitable solvent for the oil constituents, the waxy mass, or wax cake can be satisfactorily compressed under a pressure ranging from about 800 to 1500 lbs.

Suitable solvents comprise relatively non-volatile solvents so as to avoid loss of the solvent when the press is opened to dump cakes. Examples of suitable solvents are heavy naphtha, kerosene, high molecular weight ketones, such as methyl isobutyl ketone and methyl normal ketone, etc.

The solvent is mixed with the waxy concentrate or slack wax in the proportion of about 10% to 50% by weight of the concentrate. If the wax is relatively lean in oil, for example, contains only about 15% oil, the proportion of solvent necessary will thus be about 15% to 20% and sufficient to dilute the oil so that it can be readily squeezed out between the crystals of wax.

The object of the invention is thus to produce by a new method a de-oiled or substantially oil free wax of desired melting point characteristics.

If the slack wax is obtained from the dewaxing of relatively low boiling lubricating oil fractions, the de-oiled wax obtained by the filter pressing step of my invention will be of relatively low melting point. The wax obtained from higher boiling point fractions of petroleum will have correspondingly higher melting points. Instead of separately charging to the hydraulic press slack wax obtained from the dewaxing of individual lubricating oil fractions of different boiling range, an alternative method is contemplated in which the slack wax from all these different sources is combined and this mixture subjected to filter pressing under elevated pressure, advantageously in stages, so as to produce succeeding fractions of wax having correspondingly higher melting points.

The slack wax obtained in the conventional dewaxing of lubricating oils, has mixed with it substantial amounts of dewaxing solvent liquid. In the practice of my invention a large portion of this solvent is advantageously removed prior to filter pressing under elevated pressure. It may be desirable to remove it entirely, particularly if it is relatively volatile and substitute a less volatile solvent such as mentioned above. If the slack wax is already substantially free from solvent, it is also desirable to add some solvent prior to filter pressing, although it is contemplated that there may be some instances where the slack wax is of such nature that it may be subjected to pressing in the substantial absence of any solvent.

In the case of a slack wax obtained in the selective solvent dewaxing of a lubricating oil stock of relatively wide boiling range the greater part of the solvent retained in the slack wax is removed therefrom by distillation or some other similar method. The slack wax then containing about one half volume of solvent per volume of slack wax is introduced to a hydraulic filter press at a temperature of 80 and 90° F. and then filtered and compressed under a pressure of about 1000 to 1500 pounds. There will be obtained a filtrate comprising solvent, oil and a substantial amount of dissolved wax. The wax contained in this filtrate will be of lower melting point than that left behind in the filter cake. The filter cake will comprise wax having a melting point of around 140 to 150° F., for example, and substantially free from oil. The filtrate can be cooled to a temperature of about 50° F. and again charged to the filter press, wherein it is filtered under substantially the same pressure conditions which produce a wax cake comprising wax of around 125 to 130° F. melting point. The filtrate resulting from this second pressing can, if desired, be cooled to a temperature of about 40° F., and again subjected to pressure filtration, thereby producing a de-oiled wax having a melting point of around 120° F.

On the other hand, where the slack wax is composed almost entirely of wax of rather narrow melting point range and where the slack wax is derived from the dewaxing of a narrow cut of lubricating oil, the filter pressing may be carried out in a single stage. In such case the solvent may be largely removed from the slack wax prior to filter pressing. The pressed wax obtained in this case may still retain some oil. It can therefore be mixed up with a small amount of diluent or solvent liquid. The amount of solvent so added is approximately equivalent to the amount of oil retained in the cake. This mixture is then subjected to filter pressing under elevated pressure to thereby remove the final traces of oil.

The slack wax obtained in the conventional selective solvent dewaxing of lubricating oil stock frequently contains a substantial amount of oil. For example, the slack wax from the dewaxing of the Mid-Continent distillate stock of around 180 Saybolt Universal seconds viscosity at 100° F. has been found to comprise, after removal of the solvent, about 48½% oil and 51½% wax. By pressing this mixture of oil and wax under a pressure of 1500 pounds gauge at room temperature, about 85 or 90% of the oil is removed in the filtrate. This oil will have a pour test of around 75° F.

The wax cake is hard and dense, but slightly oily. This cake can be crushed and a small amount of solvent, such as mentioned above, added thereto. This mixture is again pressed at room temperature under about the same pressure, producing a semi-refined oil free wax.

The oil obtained in these pressing operations, due to the presence of wax in it, is advantageously recycled after solvent removal, through the conventional dewaxing operation wherein it is dewaxed along with fresh lubricating oil stock. In this way the recycled oil is recovered as a low pour test oil.

Instead of the second pressing step mentioned above, the deoiled wax resulting from the initial pressing under 1500 pounds pressure may be treated with an oil solvent, such as furfural, at an elevated temperature at which the wax is in a liquefied condition. In this way the small amount of retained oil is extracted from the liquefied wax at elevated temperatures.

It is also contemplated that the de-oiled wax obtained by the filter pressing step of my invention may be subjected to vacuum distillation in order to separate it into fractions of different melting point.

In order to further describe the invention reference will now be made to the figures of the accompanying drawing. Both Fig. 1 and Fig. 2 are in the form of diagrammatic flow sheets, each figure illustrating a modification of my invention.

Figure 2:
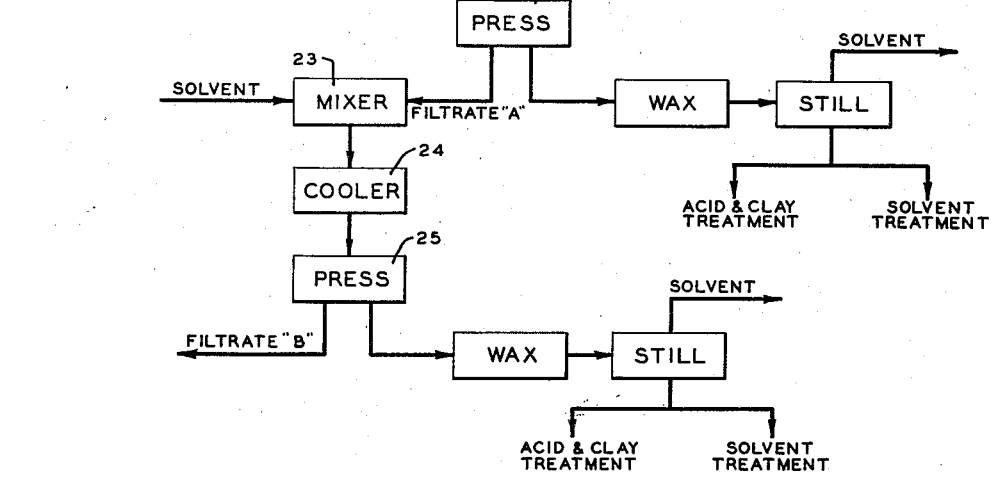

As indicated in Fig. 1, wax-bearing lubricating oil stock, from a source not shown, is conducted to a mixer 1. The dewaxing solvent liquid, consisting of a mixture of methyl ethyl ketone and commercial benzol, is likewise conducted, from a source not shown, to the mixer 1. The solvent mixture may consist of about 40% ketone and 60% benzol, depending upon the nature of the wax-bearing oil stock. The solvent is mixed with the oil in the proportion of about 3 or 4 parts of solvent to 1 part of oil.

This mixture is passed through a chiller 2, wherein it is chilled to a temperature of around 0° F. or below to precipitate the wax.

The chilled mixture is then conducted to a filter 3, wherein the precipitated wax is removed as a filter cake, referred to in this instance as slack wax. The dewaxed oil is removed as a dewaxed filtrate. The slack wax may contain around 70 or 80% by volume of solvent. It is conducted to a still 4, wherein a portion of the solvent is removed. Where it is desired to use a different type of solvent in the subsequent steps, substantially all the dewaxing solvent is removed in still 4.

The slack wax is next conducted to a mixer 5, wherein it is mixed with added solvent, and with recycled oil and solvent, as will be subsequently described. The mixing may be effected at a temperature of around 120° F. The resulting mixture is then drawn off through a cooler 6, wherein it is cooled to a temperature of around 50 to 90° F.

The cooled mixture is then introduced to a pot press 7. Filtration proceeds in the initial stages at relatively moderate pressure in the order of 40 to 200 or 300 pounds, during which deposition of filter cakes upon the filtering surfaces takes place. Following this, the charge is discontinued and the cakes subjected to compression under a pressure of from 800 to 1500 pounds.

The filtrate produced in the low and high pressure steps is removed and conducted to a still 8. The solvent and a small amount of relatively low boiling oil are stripped from the more waxy oil and all or part of this distillate recycled to the mixer 5 previously mentioned. The waxy oil, all or in part, is conducted to the mixer 1, wherein it is recycled through the dewaxing operation to remove its wax content.

After compression the press is opened to permit dumping and removal of the pressed wax cakes. This semi-refined wax is conducted to a still 9 wherein solvent and a small amount of oil is removed as a distillate. This distillate may be returned, all or in part, to the mixer 5.

The wax remaining in the still 9 is withdrawn and may be subjected to vacuum distillation, treatment with acid and clay, or treatment with a solvent at elevated temperatures.

Thus, in the vacuum distilling step the wax can be fractionally separated into fractions of different melting point, as, for example, fractions having melting points of 125–130° F., 130–140° F. and 150–160° F., respectively. These fractions may be finished up by contacting with clay to produce refined wax.

Where the wax is treated with a solvent, it is contemplated treating it in a liquid condition at elevated temperatures with a solvent such as furfural. Under these conditions the solvent removes as an extract phase the remaining oil, thereby producing an oil-free wax.

In some cases it may be desirable to produce from topped crude petroleum individual distillate fractions of lubricating oil, such as light, medium and heavy distillate fractions, respectively. These fractions are separately dewaxed in a manner similar to that described above to produce slack wax. The individual slack wax may then be combined and processed as described above. That is, it may be diluted with a small amount of naphtha or other solvent, filtered in the filtering press 7 to produce a semi-refined crude wax. The solvent is recovered from this crude wax and the wax then vacuumed distilled to separate it into fractions of different melting point.

Referring to Fig. 2: Slack wax from any of the sources mentioned above is introduced to a mixer 20 wherein it is mixed with a small amount of naphtha or other solvent at a temperature of about 120° F. The warm mixture is passed through a cooler 21 and cooled to a temperature of about 85 to 90° F. This cooled mixture is introduced to a press 22, similar to that described above, to separate oil therefrom and produce a semi-refined wax of about 150° F. melting point.

This wax is removed, and introduced to a still wherein the solvent is recovered therefrom. The stripped wax may then be treated with acid or, instead, may be treated with a solvent such as furfural, and then contacted with clay to produce a refined wax.

The filtrate issuing from the press 22 is drawn off to a mixer 23 wherein it is mixed with an additional amount of solvent, if necessary, and then conducted through a cooler 24 wherein it is cooled to about 50° F.

This cooled mixture is then charged to another press 25 to produce a secondary filtrate and a semi-refined wax of about 130 to 135° F. melting point. The solvent is recovered from this wax and the wax then treated by either of the methods just previously described.

The secondary filtrate can be further pressed by filtering in a third press at a lower temperature, for example, around 30 to 40° F. to produce wax of 120° F. melting point. On the other hand, this secondary filtrate may be recycled as, for example, through the preliminary dewaxing steps.

Where the term "slack wax" has been used in describing the invention and in defining it in the appended claim, it is intended that the term "slack wax" shall include within its scope any hydrocarbon waxy mixture or concentrate relatively rich in wax derived from any source whatsoever.

Obviously many modifications and variations of the invention, as hereinbefore set forth, may be made without departing from the spirit and scope thereof and therefore only such limitations should be imposed as are indicated in the appended claim.

I claim:

The method of separating wax from wax-bearing mineral lubricating oil which comprises mixing the oil with a dewaxing solvent, chilling the mixture to a temperature of 0° F. and below, forming a precipitate of wax containing solvent and some oil, removing said precipitate, adjusting the solvent content thereof to form a mixture containing solvent in amount about equal to the amount of oil present, passing the adjusted mixture to a filter press of the plate and frame type, subjecting it to filtration therein at a temperature of around 50 to 90° F. and under a pressure of around 40 to 300 pounds per square inch gauge to remove liquid constituents of the adjusted mixture and produce a filter cake of reduced liquid content, and thereafter subjecting the filter cake in situ to a pressure in the range of 800 to 1500 pounds per square inch gauge such that the remaining liquid is forced from the wax cake without substantial extrusion of wax through the filtering medium.

ROBERT E. MANLEY.